United States Patent
Brown

(10) Patent No.: US 8,221,051 B2
(45) Date of Patent: Jul. 17, 2012

(54) SYSTEMS AND METHODS FOR MAXIMIZING ENERGY EXTRACTION FROM MOVING FLUIDS

(75) Inventor: Lawrence George Brown, Honolulu, HI (US)

(73) Assignee: Newtonian Honeycomb, LLC, Incline Village, NV (US)

(*) Notice: Subject to any disclaimer, the term of this patent is extended or adjusted under 35 U.S.C. 154(b) by 0 days.

(21) Appl. No.: 12/830,432

(22) Filed: Jul. 5, 2010

(65) Prior Publication Data
US 2011/0229318 A1 Sep. 22, 2011

Related U.S. Application Data

(60) Provisional application No. 61/350,334, filed on Jun. 1, 2010.

(51) Int. Cl.
*F03B 13/12* (2006.01)
(52) U.S. Cl. .......................... 415/3.1; 415/92
(58) Field of Classification Search .............. 415/3.1, 415/5, 7, 8, 905, 6, 92; 416/7; 91/229, 303, 91/265, 271, 235, 272; 60/369
See application file for complete search history.

(56) References Cited

U.S. PATENT DOCUMENTS

| 867,843 | A | | 10/1907 | Schmidt | 416/8 |
| 1,525,600 | A | * | 2/1925 | Woolever | 415/5 |
| 3,882,320 | A | * | 5/1975 | Schmeller | 290/43 |
| 3,927,330 | A | | 12/1975 | Skorupinski | 290/54 |
| 3,957,390 | A | | 5/1976 | Miller | 415/5 |
| 7,453,166 | B2 | | 11/2008 | Power et al. | 290/54 |
| 2009/0092490 | A1 | | 4/2009 | Brooks | 416/24 |

FOREIGN PATENT DOCUMENTS

KR 10-2009-0092490 3/2009
KR 10-2010-0039645 4/2010

OTHER PUBLICATIONS

International Search Report and Written Opinion issued in PCT/IB2011/52355, dated Nov. 18, 2011.

* cited by examiner

*Primary Examiner* — Dwayne J White
(74) *Attorney, Agent, or Firm* — Fulbright & Jaworski L.L.P.

(57) ABSTRACT

One example embodiment includes a system for extracting kinetic energy from moving fluid masses. The system includes an encapsulator, where a fluid enters the encapsulator. The system also includes decelerator, where the decelerator reduces the velocity of the encapsulated fluid to near zero velocity transferring the kinetic energy originally in the incoming fluid to the decelerator.

16 Claims, 12 Drawing Sheets

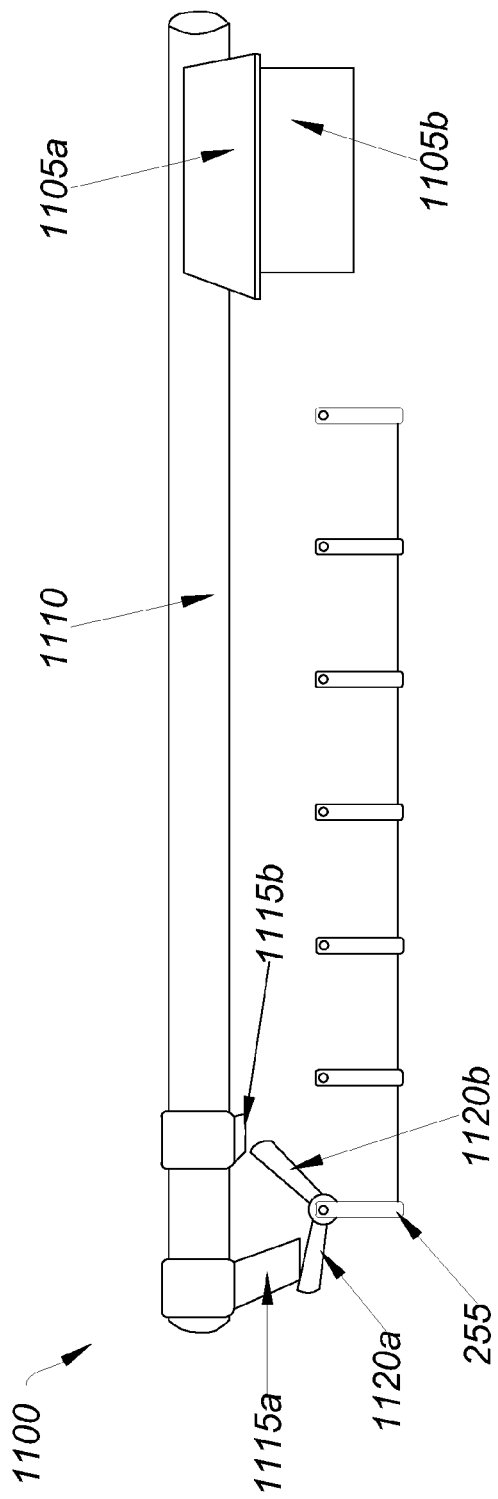
FIG. 11A
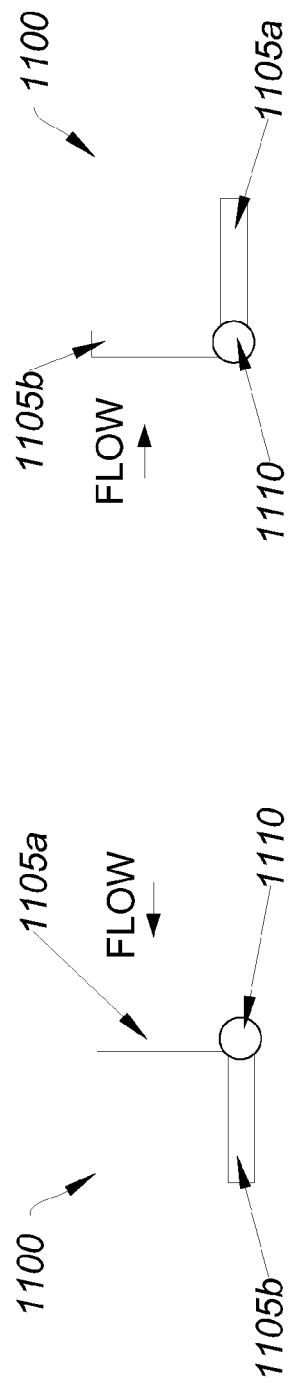
FIG. 11B
FIG. 11C

SYSTEMS AND METHODS FOR MAXIMIZING ENERGY EXTRACTION FROM MOVING FLUIDS

CROSS-REFERENCE TO RELATED APPLICATIONS

This application claims the benefit of and priority to U.S. Provisional Patent Application Ser. No. 61/350,334 filed on Jun. 1, 2010, which application is incorporated herein by reference in its entirety.

This application is a continuation-in-part of U.S. Utility patent application Ser. No. 12/579,978 filed on Oct. 15, 2009, which application is incorporated herein by reference in its entirety. Application Ser. No. 12/579,978 claims the benefit of and priority to U.S. Provisional Patent Application Ser. No. 61/213,702, filed Jul. 6, 2009; U.S. Provisional Patent Application Ser. No. 61/213,837, filed Jul. 20, 2009; U.S. Provisional Patent Application Ser. No. 61/230,096, filed Jul. 30, 2009; U.S. Provisional Patent Application Ser. No. 61/233,068, filed Aug. 11, 2009; U.S. Provisional Patent Application Ser. No. 61/272,052, filed Aug. 12, 2009; and U.S. Provisional Patent Application Ser. No. 61/244,027, filed Sep. 19, 2009. The disclosures of these applications are incorporated herein by reference in their entirety.

BACKGROUND OF THE INVENTION

Prior-art apparatuses for extracting the energy from masses of moving or flowing fluids generally utilize the immersion of one or more blades in a moving fluid. The blades are coupled to a rotating shaft. The extraction of the energy in the flowing fluid is attempted to be optimized by proper design and orientation of the blades.

The portion of the energy extracted by the blades from the moving fluid is delivered by causing a shaft coupled to the blades to rotate with torque that is usually some fraction of the energy brought to the scene by the moving fluid, yet sufficient to supply some energy to the load coupled to the shaft, such as a pump, generator, or . . . . Examples of such prior-art energy extraction devices are wind turbines, water turbines, steam turbines, paddle wheels, and the like.

While such prior-art extracters have a long and successful history, they are lacking in efficiency in some cases, and convenience in others. For example, a well-known Betz's law, states that a wind turbine can in theory extract only a maximum of 59% of the energy of the wind incident on the turbine. In practice the extracted energy never exceeds 70-80% of the theoretical Betz limit; thus the best one can expect from running wind turbines is between 41-47% of the energy present. Wind turbines, like solar extracters, are intermittent, and most can actually extract energy only when the wind speed is between about 2.5 to 25 meters/second (m/s). The seasoned practitioners in the art—when pressed—admit that overall delivery expectancy from all now visible such devices will not be more than about 30% of the energy actually available for our taking from the of moving fluids incident to them. That most discouraging conviction includes tidal sea movements, and power from "hydro" origins is barely included any more in the "knowledgeable" projections of energy sources.

The newest attempts to extract energy from the seas are the various "wave machines"; each uses the vertical lift of the sea wave as the input, sometimes to drive a generator directly, or to do so through various forms hydraulic or pneumatic devices.

Because of the meager yield from each device, they are often grouped in chains or an array of units packaged into one container.

PR for the whole field (an essential tool in fund raising) has become frantic, and truth is very difficult to determine. The actual results of the various attempts are so far from the loudly proclaimed ones, that the June 2010 issue of POPULAR MECHANICS, in its excellent review of the renewables situation, takes on as "Myth No. 5—TIDAL POWER IS A LOST CAUSE" on page 74.

No environmental group has as yet awaken (with horror) to what our shores would look like when a serious effort to produce some of our energy needs from the various wave devices is attempted—and endless bouy's and hinged chains of large metal boxes would have scarred the near seas. Scotland has declared itself the "Saudi Arabia of Marine Power", and commendable efforts to sort out the field are in progress there. They list (via www.bwea.com/marine Note: "bwea" is now known as "RENEWABLESUK"), the "three main methods" for extracting energy from tidal or otherwise "currents", as being "Cross Flow Turbines" "Reciprocating Hydrofoils", and "Axial Turbines". Popular Mechanics states than an "array of Axial Turbines (at least 3?) "operated for more than 9000 hours" in year 2008, in New York's East River, "delivering 70,000 KWHrs"; if that is correct, than each Axial Turbine produced appx 70000/(3×9000)=2.6 kwh . . . . The "output" of such turbine is shown in an ad also pictured there as 35 kw. British Petroleum—now famous for another most unfortunate reason—has not too long ago been promoting its initials, BP, as "Beyond Petroleum . . . . Then, perhaps not surprisingly, the hard headed oil men seemed to move away, in a virtual abandonment, from the hope that other than fossil fuels can possibly produce even a significant portion of the world's annual 15,406 Tera Watt Hours electric power use . . . (2004 CIA World Book) Note: 1 TWhr=1,000,000,000,000 Watt Hrs.

Yet many knowledgeable sources mirror the 1995 Report to the Office of Science and Technology of the British Commons (by the Marine Foresight Panel), which states that if only 0.01% of the seas energy were captured, it would equal to 5 times the entire world's need for energy . . . .

The movement of masses of fluids, especially in the seas alone, CAN yield all the energy we need. This application hopes to start a movement toward far greater, more serious, energy quantity extraction from each installation, and perhaps accelerate the unavoidably coming conclusion: "YES we CAN! become less and less fossil fuels dependent, in a major way, starting NOW . . . .

Advantages

As a sense of the magnitude of the difference between the current "main efforts", and what this application is attempting to achieve:

The cross section of an array of 3 Axial Turbines (such as pictured in the Popular Mechanics review on pg 74), placed on a common triangular frame, occupies an appx 50 ft wide, (3×15 ft width for each turbine), by roughly 30 ft high=1500 sq ft rectangle facing the fluid flow. The volume of flow defined by that size rectangular cross section and the speed of flow of 2.5 meters per second, at which the displayed turbines were apparently rated, has an energy content of appx 1,000 kw. The 3 turbines occupying it, IF RUNNING at 100% efficiency non stop, CLAIM only 3×35=105 kw, or about one tenth (10%) . . . . In real life, probably about 35-50 kw for the 3, or less than one twentieth (5%) available from that portion of the fluid flow.

If the efficiency of our method and systems applied for here, winds up being only 30%, we would still be several times order of magnitude better the current "main method", capturing at minimum 330 kw or so. As we build actual units and measure and correct our progress, it is my sincere belief that we should arrive at between 50 and 85% efficiencies, thus yielding between 500 kw and 850 kw from the same fluid flow segment now occupied by the three turbine array referred to as one of the current "main methods". But even if our efficiency will be only 30%, the energy our method and systems can derive from the seas makes them look like a no longer dismissible giant in renewable energy sources. And, unlike the various wave machines which would so clutter our shores and seas as to make their deployment simply not permissible, our systems can be totally submerged, invisible from shore or sea, can be placed deeper, below navigation lanes; water tight electricity production chambers can be a part of the units, if desired.

BRIEF SUMMARY OF SOME EXAMPLE EMBODIMENTS

This Summary is not intended to identify all the key features or essential characteristics of the claimed subject matter, nor is it intended to be used as determining the entire scope of the claimed subject matter.

All embodiments are based on Newton's teachings for energy and momentum transfers (whether from one particle, or major aggregates there off—to another body of mass): a selected portion of a mass of a fluid moving at its nature given velocity V is brought to a complete, or nearly complete, stop; the "stopping" device receives, is the beneficiary of, the entire Kinetic Energy—½ m(V square)—originally possessed by that portion of the flowing fluid, and delivers that energy either directly for useful use immediately, or stores it in an energy sink for later use.

A portion of flowing fluid is caused to enter a flow thru an enclosure (tunnel); The cross section of that "tunnel" (sq ft), and the square of velocity of the flowing fluid, determine the order of magnitude of the amount of energy which will be extracted.

An obstacle of not significant mass, functioning like a sail, closing off the entire cross section of the tunnel, and mounted on a rolling trolley freely movable on at least four railroad like rails—is placed in the way of the incoming flow of fluid—and is driven like a piston within a cylinder by the flow of the incoming fluid;

After the obstacle is propelled to, or near to, the current velocity of the flowing fluid, the obstacle is decelerated to zero, or near zero, velocity—causing the entire volume of the fluid within the tunnel (or any other encapsulation means) behind it—also go down to zero, or near zero velocity—yielding its all, or near all, velocity related energy to the decelerating means.

The decelerating means can be virtually any effective system, providing that it highly efficiently receives and transfers the entire amount of the mechanical energy taken from the obstacle and the mass of the fluid trapped in the tunnel (or other encapsulated media) behind it, directly to the user, or an energy sink from which the user(s) then take it.

Two of many of such decelerating means are depicted here: one uses a rapidly shifting gear ratio between the obstacle and the output flywheel; the other permits the obstacle to be stopped by exchanging energy with a potential energy storage sink, where from user(s) then draw it.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 11A illustrates a side view of an example of a flow direction sensing switch.

FIG. 11B illustrates an end view of the flow direction sensing switch of FIG. 11A; and FIG. 11C illustrates an end view of the flow direction sensing switch of FIG. 11A.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
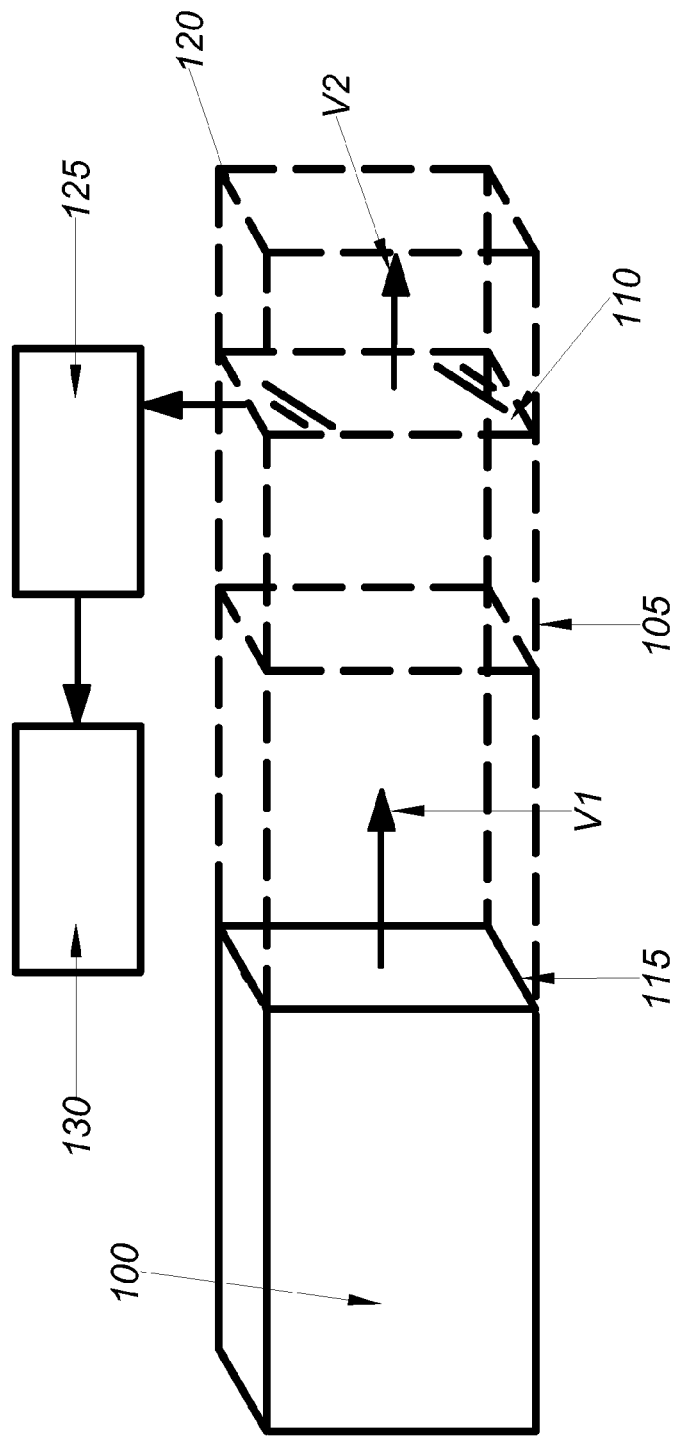
FIG. 1 illustrates a moving volume of fluid.

FIG. 1 illustrates a moving volume of fluid 100. In at least one implementation, a fluid is any substance that continually deforms or flows under an applied force. Fluids are a subset of the phases of matter and include liquids, gases, plasmas and, to some extent, plastic solids. In particular, fluids display such properties as not resisting deformation, or resisting it only lightly (viscosity) and the ability to flow (also described as the ability to take on the shape of the container). Examples of fluids include liquids, such as water, and gases, such as air.

One of skill in the art will appreciate that the fluid 100 has mass (M). Additionally, because the fluid 100 is moving, the fluid will have velocity (V), and associated kinetic energy (KE) which can be calculated as $KE=1/2*M*V^2$. In addition, the fluid contains other energy; together the energy of the fluid 100 that can be extracted is the mechanical energy of the fluid 100. One of skill in the art will also appreciate that the velocity of the fluid 100 will differ from the velocity of the individual particles within the fluid 100. That is, the individual particles will have a velocity that can be different than the velocity of the fluid 100.

In at least one implementation, the fluid 100 can be encapsulated. In particular, the fluid 100 can be part of a larger fluid flow which has been constrained in some way for energy extraction. For example, the larger fluid flow can include wind, river water flow, ocean currents, tides, waste water or any other fluid flow. Constraining a portion of the larger fluid flow can allow for more predictable energy extraction.

FIG. 1 shows that the fluid 100 can be encapsulated within a tunnel 105. One of skill in the art will appreciate; however, that the fluid 100 can be encapsulated in whatever manner is most convenient. For example, the fluid 100 can be encapsulated on all or most sides, such as in the tunnel 105. Additionally or alternatively, the fluid 100 can be encapsulated by an array of surface which is configured to retard the flow of fluid 100 or otherwise confine fluid 100 in some manner.

FIG. 1 also shows that the fluid 100 can be directed at a movable obstacle 110. In at least one implementation, the contact between the fluid 100 and the movable obstacle 110 can shift the movable obstacle 110 along tunnel 105 between an entrance 115 and an exit 120. As the movable obstacle 110 shifts from the entrance 115 to the exit 120, the fluid 100 imparts mechanical energy to the movable obstacle 110.

FIG. 1 further shows that the mechanical energy of movable obstacle 110 and the mechanical energy of fluid 100 behind movable obstacle 110 can be extracted to mechanical energy by a variable coupling 125. In at least one implementation, the mechanical energy stored in variable coupling 125 can include rotational energy.

In at least one implementation, variable coupling 125 acts weakly on the movable obstacle 110 (provides a relatively small load) at first, allowing fluid 100 to enter tunnel 105 at a velocity equal to or nearly equal to the velocity it would have if tunnel 105 and movable obstacle 110 were not present. As movable obstacle 110 is accelerated by the inflowing fluid it moves to the right toward exit 120 and variable coupling 125 increases its load or acts more strongly on the movable obstacle 110 and retards or loads the motion of the movable 110 and fluid 100 in an increasing manner. It finally brings the movement of the movable obstacle 100 and the fluid 100 confined behind it to a stop, as described below.

In at least one implementation, stopping the motion of the fluid within the tunnel 105, transfers the mechanical energy contained in the volume of fluid 100 through coupling 125 to a load 130. If load 130 is a flywheel, the mechanical energy from the fluid 100 is delivered to the flywheel and the speed of rotation of the flywheel is increased. In at least one implementation, more than one load 130 can be connected to coupling 125. Other loads can be coupled within coupling 125, and the net result of the increased mechanical energy can be delivered to load(s) 130.

In at least one implementation, the load 130 can include a generator connected to a power grid, a pump, or other energy sink. One of skill in the art will appreciate that the load 130 can include any device capable of retaining or using the mechanical energy transferred from the fluid 100. For example, load 130 can include generators, pumps, potential energy reservoirs or any other useful work performing device.

Figure 2:
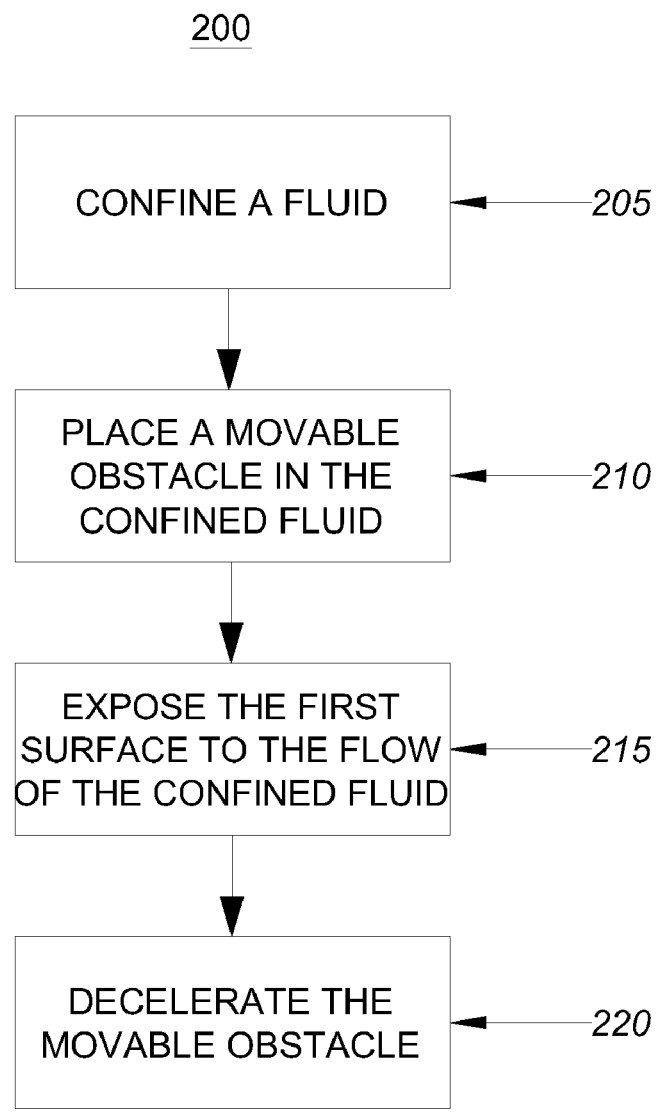
FIG. 2 is a flow chart illustrating a method for extracting energy from a flowing fluid.

FIG. 2 is a flow chart illustrating a method 200 for extracting energy from a flowing fluid. In at least one implementation, the flowing fluid contains mechanical energy, which can be extracted to electrical energy or otherwise be used to perform work. One of skill in the art will appreciate that the moving fluid can be the moving fluid 100 of FIG. 1; however, the moving fluid is not limited to the moving fluid 100 of FIG. 1.

FIG. 2 shows that the method 200 includes confining 205 a fluid. In at least one implementation, the confined fluid is a first portion of a flowing fluid. In particular, the confined fluid can include any portion of the flowing fluid which is used for energy extraction. For example, confining 205 a fluid can include placing a pipe or tunnel within the flowing fluid. In particular, tunnels can be closed on their tops, bottoms, and sides and open on their ends so that fluid can flow there through. Additionally or alternatively, the tunnels can be open on one or more sides if the one or more sides are not necessary for directing the moving fluid.

FIG. 2 also shows that the method 200 includes placing 210 a movable obstacle in the confined fluid. In at least one implementation, the movable obstacle includes a first surface. In particular, the first surface can be configured to resist the flowing fluid. That is, the first surface can be configured to provide a transfer of energy whereby the flowing fluid begins to move the movable obstacle. In at least one implementation, the movable obstacle is placed in the path of the confined fluid. In particular, the confined fluid is forced to strike the first surface of the movable obstacle. Such an arrangement can allow for maximum energy transfer, as the confined fluid is prevented from flowing around the movable obstacle.

FIG. 2 further shows that the method 200 includes exposing 215 the first surface to the flow of the confined fluid. In at least one implementation, exposing 215 the first surface to the flow of the confined fluid can occur at a first location. In particular, the first location can be near where the fluid is confined. For example, if the fluid is confined in a tunnel, then the first location can be at or near the mouth of the tunnel.

In at least one implementation, exposing 215 the first surface to the flow of the confined fluid includes closing one or more louvers. In particular, louvers can include a pressure resisting surface and an edge. The pressure resisting surface can be configured to align with adjacent louvers to form a surface that is substantially impenetrable to the fluid. In contrast, the edge is configured to offer minimal resistance to the fluid. The louver can be arranged to increase or decrease resistance to the confined fluid, as desired.

In at least one implementation, the first confined fluid moves the movable obstacle. In particular, the first confined fluid increases the velocity of the movable obstacle. If the first movable obstacle remains in the confined fluid long enough, the first movable obstacle attains the velocity, or nearly the velocity, of the flowing fluid. That is, the confined fluid flows unconstrained or nearly unconstrained behind the movable obstacle.

FIG. 2 also shows that the method 200 can include decelerating 220 the movable obstacle. In at least one implementation, the movable obstacle is decelerated to zero or near zero velocity at a second location. Decelerating the movable obstacle transfers mechanical energy from the movable obstacle and the confined fluid to the decelerating mechanism. The transferred energy can then be transformed into electrical energy or to energy in other usable forms.

In at least one implementation, the method 200 can further include placing a second movable obstacle in the flowing fluid. In particular, the first movable obstacle and the second movable obstacle can be configured to move reciprocally with and against the flow of the fluid. For example, the first movable obstacle moves toward the first location while the second movable obstacle moves toward the second location and vice versa.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3A:
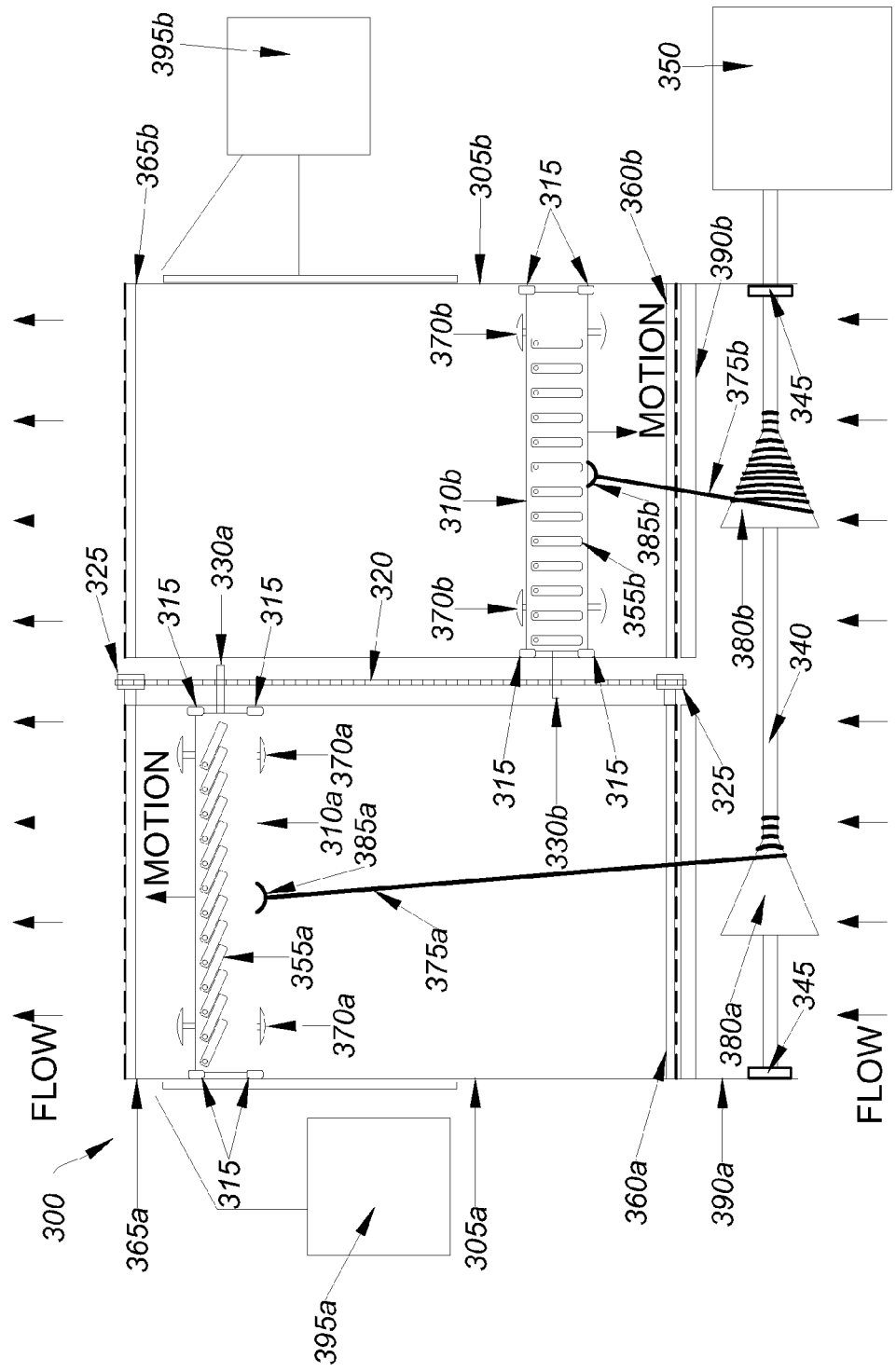
FIG. 3A illustrates a top view of an energy extractor.
Figure 3B:
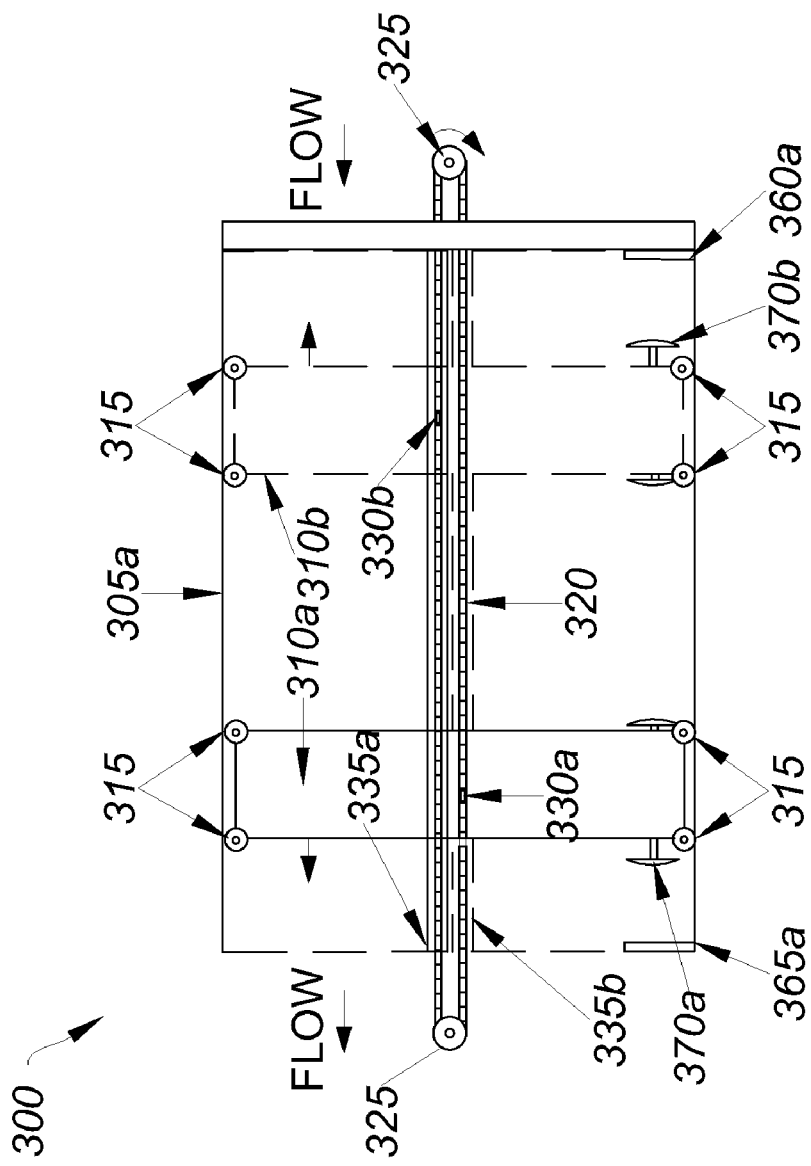
FIG. 3B shows a side view of the energy extractor of FIG. 3A.

FIGS. 3A and 3B illustrate an energy extractor 300. FIG. 3A illustrates a top view of the energy extractor 300; and FIG. 3B shows a side view of the energy extractor 300. In at least one implementation, the energy extractor 300 can be used for extracting energy from a moving fluid. One of skill in the art will appreciate that the moving fluid can be the moving fluid 100 of FIG. 1; however, the moving fluid is not limited to the moving fluid 100 of FIG. 1.

FIGS. 3A and 3B show that the energy extractor 300 can include two tunnels 305a and 305b (collectively "tunnels 305"). In particular, the tunnels 305 can be closed on their tops, bottoms, and sides and open on their ends so that fluid can flow there through. Additionally or alternatively, the tunnels 305 can be open on one or more sides if the one or more sides are not necessary for directing the moving fluid. Tunnels 305 can be arranged side-by-side, as shown in FIGS. 3A and 3B, or one can be placed over the other.

FIGS. 3A and 3B show that the energy extractor 300 can include two movable obstacles 310a and 310b (collectively "movable obstacles 310") that are configured to move reciprocally with and against the flow of the fluid within tunnels 305. In particular, movable obstacle 310b moves toward the entrance of tunnel 305b while movable obstacle 310a moves toward the exit of tunnel 305a and vice versa.

FIGS. 3A and 3B show that the movable obstacles 310 can be supported within their respective tunnels 305 by a plurality of rollers 315. In particular, the rollers 315 can constrain the movable obstacles 310 within the tunnels 305 and can allow the movable obstacles 310 to move within the tunnels 305 with a minimum of resistance. One of skill in the art will appreciate that allowing the movable obstacles 310 to move with a minimum of resistance will preserve a greater amount of energy for extraction, as discussed below.

FIGS. 3A and 3B show that the energy extractor 300 can include a guiding member 320, such as a loop of chain or cable, located in the space between tunnels 305. In at least one implementation, guiding member 320 extends the length of tunnels 305 and is supported by a pair of rotatable sprockets 325 that are located at the ends of the tunnels 305. In particular, sprockets 325 can keep the guiding member 320 taut. Additionally or alternatively, sprockets 325 can allow guiding member 320 to move easily as needed.

FIGS. 3A and 3B shows that movable obstacles 310 can further include fingers 330a and 330b (collectively "fingers 330") which extend toward the space between tunnels 305 through slots 335a and 335b (collectively "slots 335") and are in contact with guiding member 320. In at least one implementation, fingers 330 and guiding member 320 work together to ensure that movable obstacles 310 move reciprocally with respect to one another. In particular, the motion of movable obstacles 310 is synchronized by guiding member 320. Finger 330a is inserted into or connected to the lower portion of guiding member 320. Fingers 330b is inserted into or connected to the upper portion of guiding member 320. Thus when movable obstacle 310a moves toward the exit of tunnel 305a, the lower portion of guiding member 320 also moves toward the exit; and when movable obstacle 310b moves toward the entrance of tunnel 305b, the upper portion of guiding member 320 also moves toward the entrance. Thus movable obstacles 310 are constrained to move in opposite directions, urged by guiding member 320.

FIGS. 3A and 3B show that the energy extractor 300 can include a shaft 340 positioned outside the tunnels 305. In particular, the shaft 340 can be near the entrance of the tunnels 305 and can extend across both tunnels 305. In at least one implementation, shaft 340 is supported by bearings 345 affixed to rigid supports such as the outer walls of tunnels 305. FIGS. 3A and 3B show that shaft 340 can be connected an energy extraction and storage device 350. Energy extraction and storage device 350 is configured to extract energy as shaft 340 rotates, as discussed below.

FIGS. 3A and 3B show that movable obstacles 310a and 310b can contain a plurality of movable louvers 355a and 355b (collectively "louvers 355"). In at least one implementation, louvers 355 are movable between closed and open positions. In particular, when movable obstacles 310 move downstream with the fluid flow, louvers 355 are closed and when movable obstacles 310 move upstream in the fluid flow, louvers 355 are open. For example, louvers 355 can include a pressure resisting surface and an edge. The pressure resisting surface can be configured to align with adjacent louvers to form a surface that is substantially impenetrable to the fluid. In contrast, the edge is configured to offer minimal resistance to the fluid.

FIGS. 3A and 3B show that tunnels 305 can include stops 360a and 360b (collectively "stops 360") at the entrances of tunnels 305a and 305b, respectively, and stops 365a and 365b (collectively "stops 365") at the exits of tunnels 305a and 305b, respectively. In at least one implementation, stops 360 and stops 365 are located across the lower portion of the entrance and exit of tunnels 305. When movable obstacles 310a and 310b reach the end of their travel at the exit of tunnels 305, push-rods 370a and 370b (collectively "push-rods 370"), respectively, are urged against stop 365, causing louvers 355a and 325b to open, as discussed below. When movable obstacles 310 reach the end of their travel at the entrance of tunnels 305, push-rods 370 are urged against stop 360, causing louvers 355 to close, as discussed below.

FIGS. 3A and 3B show that the energy extractor 300 can include lines 375a and 375b (collectively "lines 375") attached to shaft 340 at a position near conical spools 380a and 380b (collectively "spools 380") that are coupled to shaft 340. Lines 375a and 375b are also attached to movable obstacles 310a and 310b, respectively, using brackets 385a and 385b (collectively "brackets 385"), respectively. In at least one implementation, the surfaces of spools 380 can be provided with a spiral groove to guide lines 375 and prevent slippage as lines 375 are rewound onto spools 380.

One of skill in the art will appreciate that lines 375, energy extraction and storage device 350, shaft 340 and spools 380 can form the variable coupling 125 and load 130 of FIG. 1; however variable coupling 125 and load 130 of FIG. 1 are not limited to lines 375, energy extraction and storage device 350, shaft 340 and spools 380.

In at least one implementation, as either line 375a or 375b is pulled at a first rate, the effective diameter of the attached spool 380 decreases, thereby increasing the rotation of shaft 340 at an ever-increasing rate with respect to the first rate. As fluid enters tunnels 305, it will be moving at an initial velocity, V1. As the fluid strikes movable obstacles 310, the velocity is reduced to a lesser velocity V2. The decrease in velocity of the fluid represents a decrease in the mechanical energy of the fluid. Since energy is conserved, this decrease in mechanical energy of the fluid is transferred through lines 375 to shaft 340, thereby increasing the mechanical energy within shaft 340. For example, if energy extraction and storage device 350 comprises a flywheel, the rotational rate of the flywheel, i.e. its mechanical energy is increased by an amount equal to the decrease in mechanical energy experienced by the slowing fluid and the movable obstacle 310.

By way of example, and not by limitation, the operation of the energy extractor 300 will be described. The presence of fluid flow urges movable obstacle 310a toward the exit (top of FIG. 3A; left of FIG. 3B) of tunnel 305a by the mechanical energy of the flowing fluid. Movable obstacle 310a exerts a tensional force on line 375a which engages the locked condition of spool 380a and urges shaft 340 to rotate at increasingly higher speeds against the load imposed by energy extraction and storage device 350. The inertial resistance to such rapid increase in rotation within energy extraction and storage device 350 increases the "back pull" on the movable obstacle 310a, slowing its movement and therefore the flow of water through tunnel 305a; this combination of actions, slowing or even stopping the flow in the tunnel, while increasing the force rotating shaft 340, delivers the fluid's mechanical energy to energy extraction and storage device 350. The initial motion of movable obstacle 310a is also slowed and the mechanical energy associated with the movable obstacle's mass is also delivered to energy extraction and storage device 350.

As movable obstacle 310a moves toward the exit of tunnel 305a finger 330a urges guiding member 320 to rotate. As guiding member 320 rotates, it urges finger 330b, and thereby movable obstacle 310b, to move toward the entrance of tunnel 305b. As movable obstacle 310b moves toward the entrance of tunnel 305b, 380b rotates on shaft 340, as described below, whereupon line 375b is wrapped around spool 380b.

When movable obstacle 310a reaches stop 365a, push-rods 370a cause louvers 355a on movable obstacle 310a to open, as described below. At the same time, push-rods 370b are urged against stop 360b, thereby closing louvers 355b on movable obstacle 310b, as described below. The flow now exerts force against movable obstacle 310b, urging it toward the exit of tunnel 305b and turning shaft 340, thereby delivering mechanical energy to energy extraction and storage device 350. This cycle repeats indefinitely.

The full mechanical energy of the movable obstacle and fluid is extracted from them as they are brought to a full stop, as described below in connection with energy extraction and storage energy extraction and storage device 350. The rotational energy communicated to energy extraction and storage device 350 by line 375a, spool 380a, and shaft 340 when movable obstacle 310a is decelerated as it moves downstream. The same occurs with line 375b, cone 380b, and shaft 340 when movable obstacle 310b is decelerated as it moves downstream. These rotational energies are extracted by energy extraction and storage device 350 to rotary energy for generators or the like.

When the movable obstacle with closed louvers moves within a tunnel, which may be from a few feet to any length deemed best for the given installation (with flow velocity as one tunnel length determinator), all the fluid behind the movable obstacle is trapped and moves with the same velocity as the movable obstacle. Thus the well-known relationship between kinetic energy, mass, and velocity applies, i.e., the extracted kinetic energy is equal to one-half times the total mass of the movable obstacle 310 and trapped fluid times the difference between the initial, highest velocity of the fluid and movable obstacle 310 squared, and the final velocity of the fluid and movable obstacle 310 squared. This kinetic energy is delivered to energy extraction and storage device 350, as described below.

Fluid moving through tunnels 305a or 305b from entrance to exit while the louvers 355a or 355b on either movable obstacle 310a or 310b are open represents a drag on the movable obstacles 310 when they are returning toward shaft 340. This drag on the returning movable obstacle reduces the overall efficiency of the energy extractor 300. This decrease in performance can be avoided by providing additional louvers 390a and 390b (collectively "louvers 390") at the entrances to tunnels 305a and 305b, respectively. These additional louvers 390 prevent the flow of the fluid against the returning movable obstacles 310. Louvers 390 can be motor driven and controlled by control 395a and 395b (collectively "controls 395") or they can be connected to the same parts and activated in concert with the louvers 355.

Louver assemblies 390a and 390b operate as follows: When movable obstacle 310a is moving toward the entrance to tunnel 305a, louvers 355a on movable obstacle 310a are open and louver assembly 390a is closed, thereby preventing any flow of fluid against movable obstacle 310a as it returns to the entrance of tunnel 305a. When movable obstacle 310a is moving away from the entrance of tunnel 305a, louvers 355a on movable obstacle 310a are closed and louver assembly 390a is open, permitting the full force of fluid flow against movable obstacle 310a and entrance of fluid into tunnel 305a. Closing the entrance to the tunnel while movable obstacle 310a is returning to the entrance stops the flow of water into the tunnel and prevents most of impingement by the fluid against movable obstacle 310a. Louvers 390b perform similarly for movable obstacle 310b in tunnel 305b. This action can actually increase the flow velocity in the open tunnel, adding to the mechanical energy available for extraction.

Figure 4A:
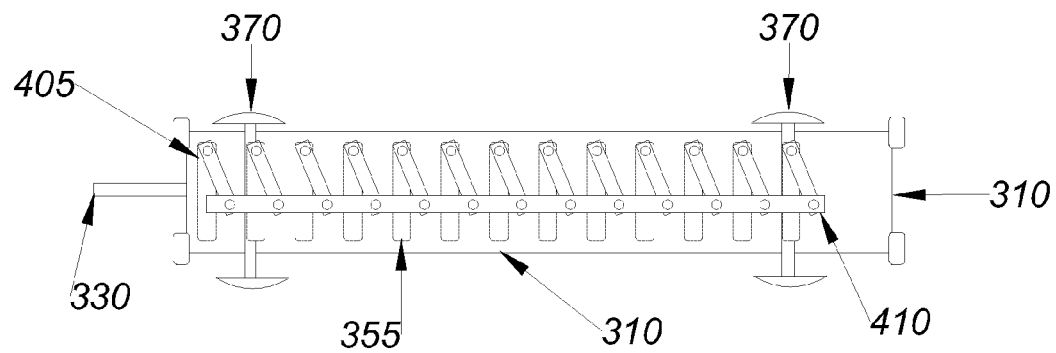
FIG. 4A illustrates a moving obstacle with louvers open.
Figure 4B:
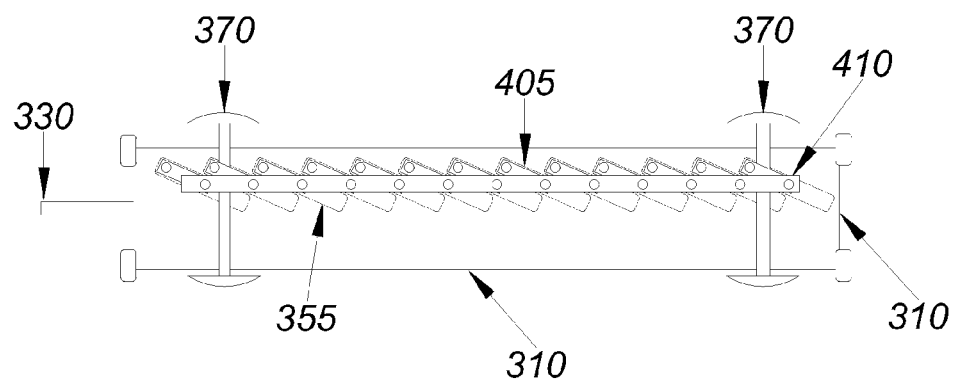
FIG. 4B illustrates a moving obstacle with louvers closed.

FIGS. 4A and 4B illustrate a moving obstacle, such as moving obstacle 310 of FIGS. 3A and 3B. FIG. 4A illustrates a moving obstacle with louvers 355 open; and FIG. 3B illustrates a moving obstacle 310 with louvers 355 closed. In at least one implementation, the moving obstacle 310 can be used to transfer mechanical energy from a flowing fluid, as described below.

FIGS. 4A and 4B that louvers 355 are rotatably connected to a finger 405. In at least one implementation, fingers 405 are rotatably connected to a bar 410. When bar 410 is in its lower position, fingers 405 and louvers 355 have rotated clockwise, placing louvers 355 in their "open" position. When bar 410 is in its upper position, fingers 405 and louvers 355 have rotated counter-clockwise, placing louvers 355 in their "closed" position.

Movable obstacles 310 further include movable push-rod assemblies 370. When push-rods 370 are urged toward movable obstacles 310, bar 410 is urged downward, placing louvers 355 in their open position. When push-rods 370 are urged toward movable obstacles 310, bar 410 is urged upward, placing louvers 355 in their closed position. When louvers 355 are open, they provide minimal resistance to the fluid and it flows freely between them. When louvers 355 are closed, they prevent fluid flow between them and the pressure of the fluid against louvers 355 tends to hold them in their closed position.

Figure 5A:
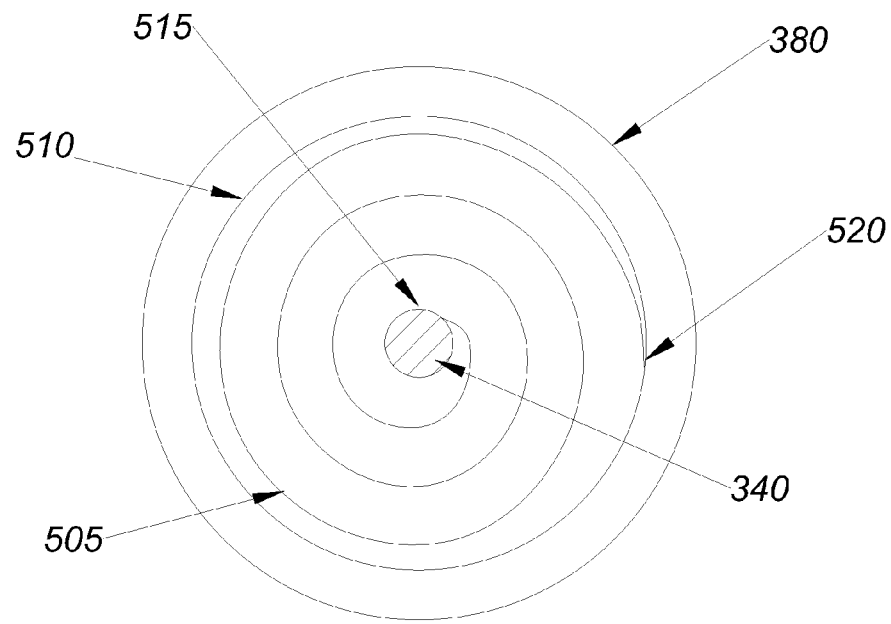
FIG. 5A illustrates an end view of spool.
Figure 5B:
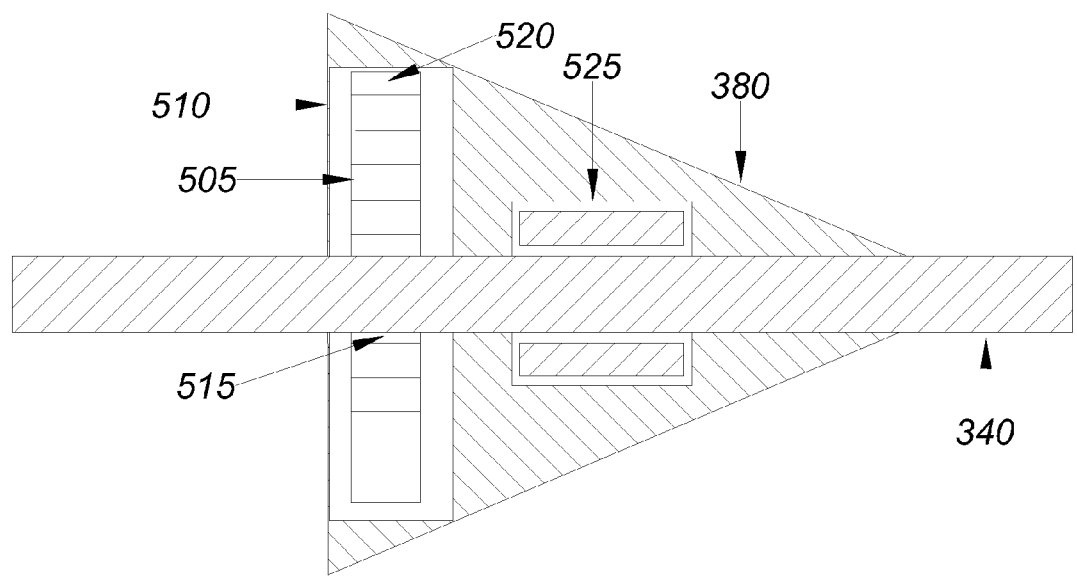
FIG. 5B illustrates a cross-sectional side view of spool.

FIGS. 5A and 5B illustrate an expanded view of spool 380. FIG. 5A illustrates an end view of spool 380; and FIG. 5B illustrates a cross-sectional side view of spool 380. One of skill in the art will appreciate that spool 380 can provide a variable coupling, such as variable coupling 125 of FIG. 1; however variable coupling 125 of FIG. 1 is not limited to spool 380.

FIGS. 5A and 5B show that spool 380 can include an outer conical section that rotates on a shaft 340. A coil spring 505 is housed within an open region 510 in spool 380. Spring 505 encircles shaft 340. At its inner end, spring 505 is secured to shaft 340 by a captive connection 515 such as a weld, screw, clip, or the like. Spring 505 is secured to spool 380 by a similar connection 520. Thus as shaft 340 rotates within spool 380 spring 505 winds more or less tightly around shaft 340. Spring 505 is pre-tensioned so that when there is no relative rotational force applied to spool 380 and shaft 340, spring 505 assumes a rest position. The rest position can be either tightly wound or strongly unwound, depending on the pretensioning of spring 505.

FIGS. 5A and 5B also show that spool 380 can include a one-way, rotary clutch assembly 525. Clutch assembly 525 permits spool 380 to rotate in only one direction on shaft 340, as described below. Spring 505 is oriented and pre-tensioned so that when spool 380 has rotated a predetermined number of times and is then released, spring 505 will urge spool 380 to return to its original rotational position with respect to shaft 340.

Figure 6:
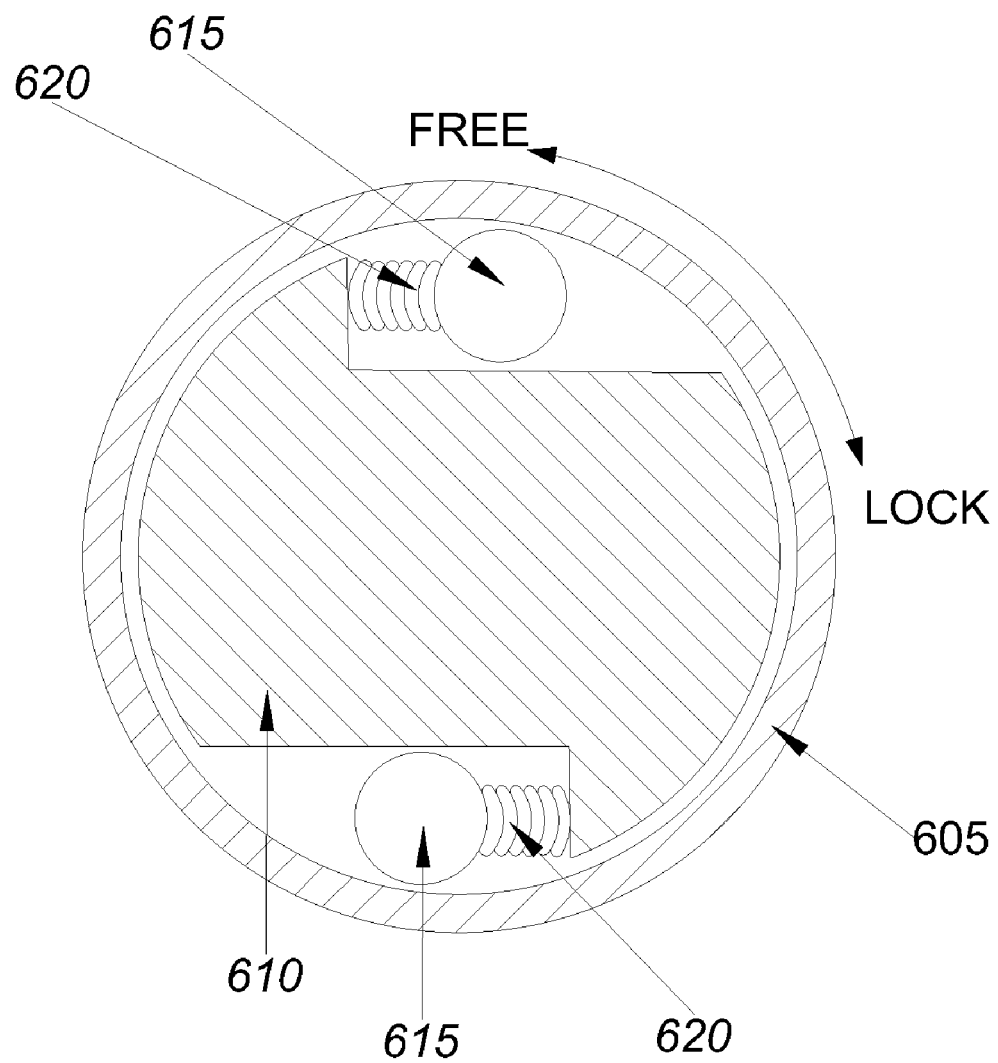
FIG. 6 illustrates a cross-sectional end view of a rotary clutch assembly.

FIG. 6 illustrates a cross-sectional end view of a rotary clutch assembly 525. In at least one implementation, rotary clutch assembly 525 is included within spool 380. Clutch 525 comprises an outer sleeve 605, an inner shaft 610, a plurality of cylindrical pins 615, and a plurality of compression springs 620 that urge pins 615 against sleeve 605. In some designs, pins 615 are replaced by balls. When shaft 610 is rotated counter-clockwise, sleeve 605 frictionally urges pins 615 against springs 620. When springs 620 are compressed, pins 615 supply a loose fit between shaft 610 and sleeve 605 and shaft 610 is free to rotate within sleeve 605. When shaft 610 is rotated clockwise, springs 620 urge balls 615 against sleeve 605, forming a wedge that locks shaft 610 and sleeve 605 together, preventing any relative rotation between the two.

Figure 7:
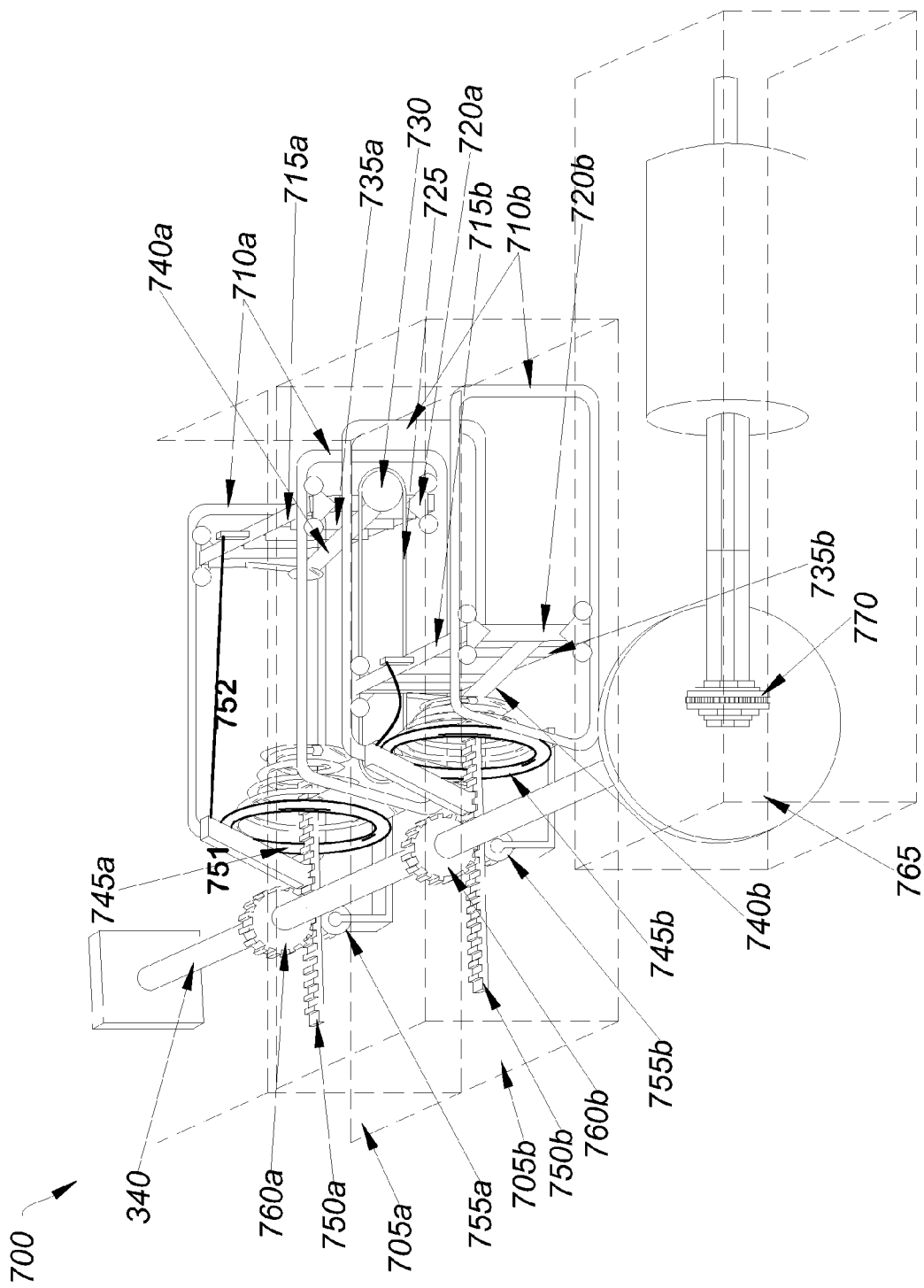
FIG. 7 illustrates a CURRENTLY PREFERRED embodiment of an energy extractor, also named "A TWO CYCLE MOVING FLUIDS DRIVEN ENGINE"

FIG. 7 illustrates an example of an alternative energy extractor 700. In at least one implementation, the energy extractor 300 can be used for extracting energy from a moving fluid. One of skill in the art will appreciate that the moving fluid can be the moving fluid 100 of FIG. 1; however, the moving fluid is not limited to the moving fluid 100 of FIG. 1.

FIG. 7 depicts the currently preferred embodiment; it shows that the energy extractor 700 can include two or more adjacent tunnels 705a and 705b (collectively "tunnels 705") placed in the moving fluid. In particular, the tunnels 705 can be closed on their tops, bottoms, and sides and open on their ends so that fluid can flow there through. Additionally or alternatively, the tunnels 705 can be open on one or more sides if the one or more sides are not necessary for directing the moving fluid. Tunnels 705 can be arranged side-by-side, as shown in FIGS. 7A and 7B, or one can be placed over the other.

FIG. 7 also shows that the energy extractor 700 includes rails 710a and 710b (collectively "rails 710") placed within tunnels 705a and 705b. In at least one implementation, rails 710 are substantially parallel to the flow of fluid within tunnels 705. In particular, tunnels 705 can direct the flow of the fluid and rails 710 can be aligned with the direction of the fluid flow.

FIG. 7 further shows that the energy extractor 700 can include movable obstacles 715a and 715b (collectively "movable obstacles 715") within tunnels 705a and 705b, respectively. In at least one implementation, the movable obstacles 715 are configured to move reciprocally with and against the flow within tunnels 705. In particular, movable obstacle 715b moves toward the entrance of tunnel 705b while movable obstacle 715a moves toward the exit of tunnel 705a and vice versa.

FIG. 7 also shows that the movable obstacles 715a and 715b can be supported within their respective tunnels 705 by roller trolleys 720a and 720b (collectively "roller trolleys 720"), respectively. In particular, the roller trolleys 720 can constrain the movable obstacles 715 within the tunnels 705 and can allow the movable obstacles 715 to move within the tunnels 705 with a minimum of resistance. One of skill in the art will appreciate that allowing the movable obstacles 715 to move with a minimum of resistance will preserve a greater amount of energy for extraction.

FIG. 7 further shows that a guiding member 725, such as a loop of chain or cable, can be located in the space between tunnels 705. In at least one implementation, guiding member 725 extends the length of tunnels 705 and is supported by a pair of rotatable sprockets 730 that are located at the ends of the tunnels 705. In particular, sprockets 730 can keep the guiding member 725 taut. Additionally or alternatively, sprockets 730 can allow guiding member 725 to move easily as needed.

FIG. 7 also shows that movable obstacles 715a and 715b can contain a plurality of movable louvers 735a and 735b (collectively "louvers 735"). In at least one implementation, louvers 735 are movable between closed and open positions. In particular, when movable obstacles 715 move downstream with the fluid flow, louvers 735 are closed and when movable obstacles 715 move upstream in the fluid flow, louvers 735 are open. For example, louvers 735 can include a pressure resisting surface and an edge. The pressure resisting surface can be configured to align with adjacent louvers to form a surface that is substantially impenetrable to the fluid. In contrast, the edge is configured to offer minimal resistance to the fluid.

FIG. 7 further shows that movable obstacle 715a and 715b can include bumpers 740a and 740b (collectively "bumpers 740"), respectively. In at least one implementation, bumpers 740a and 740b can make contact with decelerators 745a and 745b (collectively "decelerators 745"), respectively. In particular, bumpers 740 can prevent any contact between movable obstacles 715 and decelerators 745 from damaging movable obstacles 715.

In at least one implementation, decelerators 745 are configured to decelerate the movable obstacles 745. In particular, the decelerators are attached to rails 710. Thus, the decelerators 745 can capture the mechanical energy of the movable obstacles 715 and the encapsulated fluid propelling the movable obstacles 715. For example, the decelerators 745 can include springs and other potential energy storing systems, or other devices that are configured to decelerate the movable obstacles 715, a variety of which will occur to those in the art.

FIG. 7 also shows that decelerators 745a and 745b are attached to racks 750a and 750b (collectively "racks 750"), respectively. In at least one implementation, rack 750a is supported between support roller 755a and one-way clutch gear 760a and rack 750b is supported between support roller 755b and one-way clutch gear 760b. As the bumpers 740 contacts and deforms decelerators 745, gears 760 and rack 755 retain the decelerator 745 in the deformed position, (arrested by a ratchet 751 or the like), thus retaining the mechanical energy imparted to the decelerator 745. As the obstacle 715b begins its return toward tunnel 705b entrance, and the bumper 740 has achieved enough clearance from the deformed decelerator 745b, the further movement of obstacle 715b releases the ratchet 751 via tension in cable 752, which connects the obstacle 715 to ratchet 751. That release causes the decelerator 745b to "fire" by springing back to its non-deformed position.

That rapid expansion yanks rack 750b toward the tunnel 705b entrance, which in turn spins one way clutch gear 760b (here counterclockwise), and deposits the energy taken by decelerator 745b from the deceleration of both, the obstacle 715b and the mass of the fluid trapped in the tunnel 705b behind it—in the output shaft 340.

FIG. 7 shows that shaft 340 can be connected to a flywheel 765. Flywheel 765 can, in turn, be connected, thru an infinitely variable clutch 775 if desirable, to a load, where the rotation energy is extracted to electrical energy or other useable energy. The flywheel 765 and thereto connected elements can be placed in a water tight enclosure, with shaft 340 entering it thru a standard water tight rotational seal; a small air pump can be added to keep the interior of said enclosure at a pressure slightly higher than the fluids outside to keep the interior dry.

Figure 8:
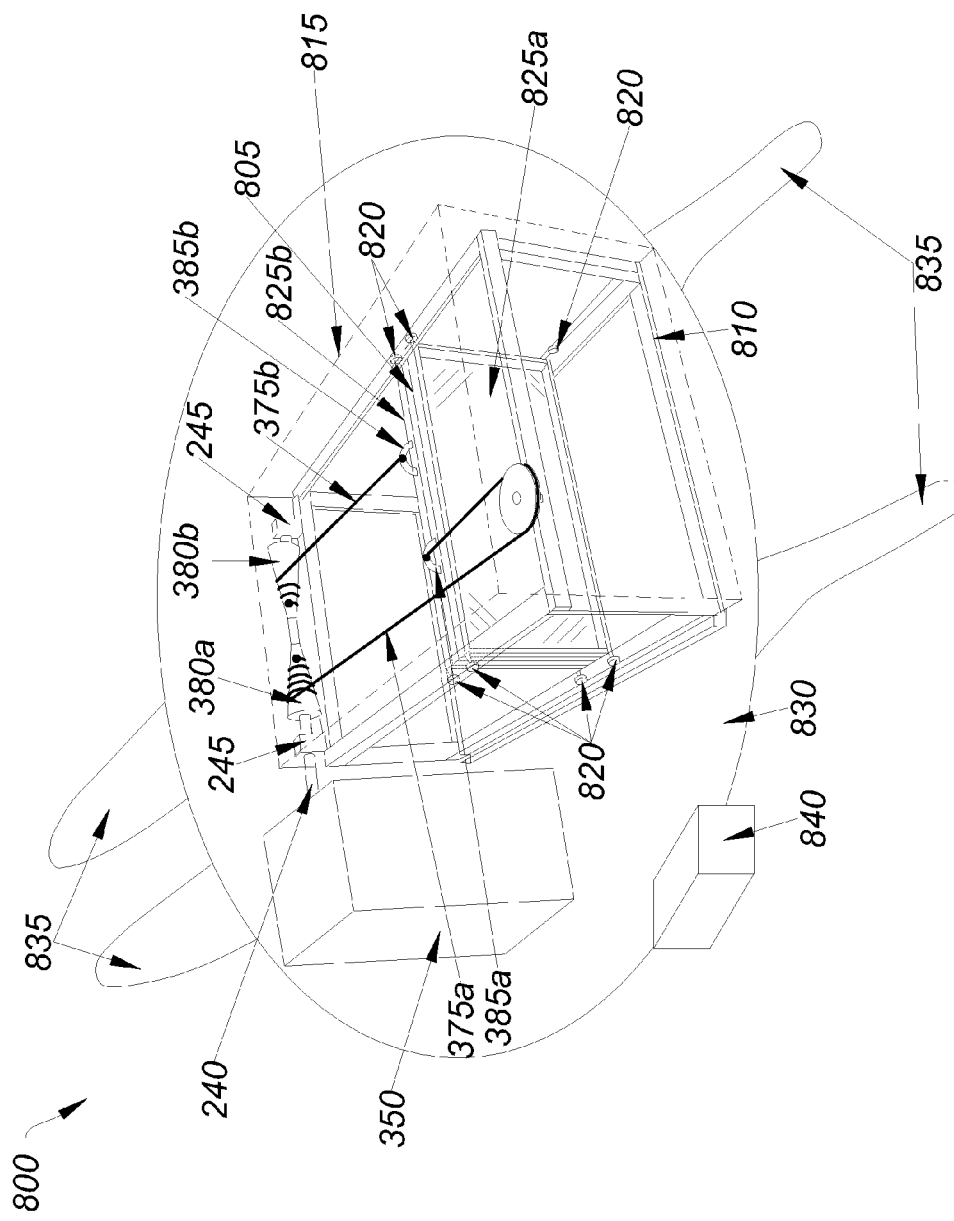
FIG. 8 illustrates a perspective view of an alternative energy extractor.

FIG. 8 illustrates a perspective view of an alternative energy extractor 800. In at least one implementation, the energy extractor 800 can be used in fluids that ebb and flow, such as oceanic tides, winds that change direction, and the like. A movable obstacle 805 is constrained to move within a framework 810 that is contained within a tunnel 815, indicated by dashed lines.

Movable obstacle 805 is supported by a plurality of rollers 820. Movable obstacle 805 includes a first surface 825a and a second surface 825b opposite the first surface. In at least one implementation, the movable obstacle 805 is moved a first direction by fluid flow in the first direction which pushes on the first surface 825a. When the direction of fluid flow reverses, the movable obstacle is moved in a second direction by fluid flow in the second direction which pushes on the second surface 825b.

FIG. 8 shows that the energy extractor 800 can include a shaft 240 which is supported by bearings 245 mounted on frame 810. In at least one implementation, shaft 240 is connected to an energy storage and extraction device 350 that either stores energy it receives or can extract the energy to electrical energy or energy in other usable forms.

FIG. 8 also shows that the energy extractor 800 can include a pair of conical spools 380a and 380b mounted on shaft 830. In at least one implementation, spools 380a and 380b operate to store the mechanical energy imparted by the confined fluid to the movable obstacle, as described above. A pair of lines 375a and 375b are secured to sail 805 by brackets 385a and 385b at one end. At the other end, lines 375a and 375b are secured to spools 380a and 380b, respectively.

FIG. 8 further shows that energy extractor 800 can include a turntable 830. In at least one implementation, the turntable 800 can support the energy extractor in order to rotate it into the most favorable orientation with respect to flow of the fluid through tunnel 815. A pair of submergible catamaran hulls 835 can be used to aid in aligning tunnel 815 with the fluid flow. An optional drive source 840, taking directional commands from a weather vane-like device submerged in the fluid, can be used to orient tunnel 815 with the fluid flow.

In operation, movable obstacle 805 traverses back and forth within tunnel 815 in response to the flow of fluid in and out of tunnel 815. Spools 380a and 380b operate alternately to turn shaft 240 and rewind lines 375b and 375a, as described above. As described above, the mechanical energy derived from slowing the motion of movable obstacle 805 is also delivered to device 350 along with the mechanical energy contribution from the decelerating fluid.

Figure 9:
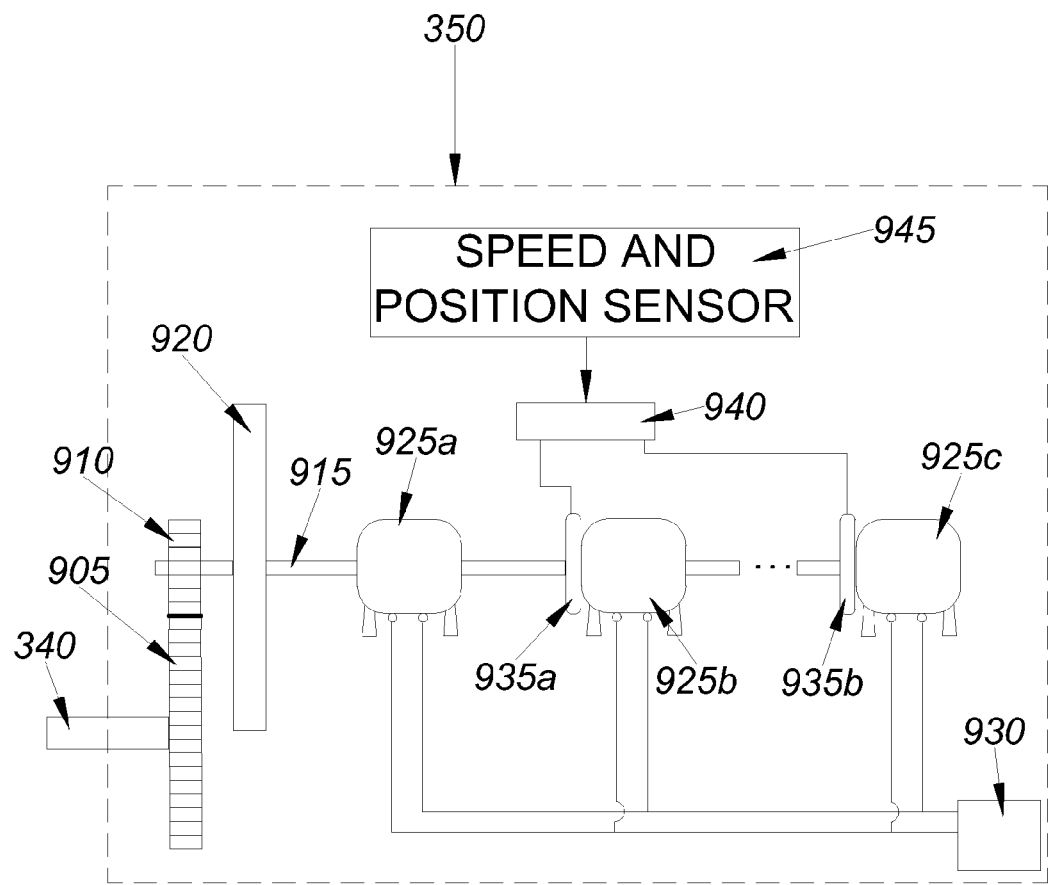
FIG. 9 illustrates an example of an energy storage and extraction device.

FIG. 9 illustrates an example of an energy storage and extraction device 350. In at least one implementation, the energy storage and extraction device 350 can be used to increase the torque required to turn shaft 340. In particular, it acts with the increasing diameter of spools 380 to slow the motion of movable obstacles. By slowing the motion of the movable obstacles, the mechanical energy present in the motion of the mass including the movable obstacle and the fluid confined behind the movable obstacle is reflected in increasing torque applied to shaft 340. This increased torque is absorbed by energy storage and extraction device 350.

FIG. 9 shows that energy storage and extraction device 350 can include a gear 905 secured to shaft 340. In at least one implementation, gear 905 drives gear 910; gear 910 is supported on a shaft 915 and a flywheel 920. Shaft 915 drives a generator 925a whose output is connected to a load 930. Shaft 915 continues through generator 925a and passes through a clutch 935 and a second generator 925b and a predetermined number of subsequent clutches 935b generators 925c. Although shaft 915 passes through the second generator 925b, it is coupled to generator 925b only when clutch 935 is activated. I.e., when clutch 935 is not activated, shaft 915 rotates as it passes through generator 925b without turning the rotor within generator 925b. Thus when clutch 935 is not activated, generator 925b does not deliver any power to load 930, nor does it constitute a torque load on shaft 915. When clutch 935 is activated, shaft 915 turns the rotor within generator 925b and causes it to deliver power to load 930, while simultaneously providing an additional torque load on shaft 915.

In at least one implementation, flywheel 920 stores mechanical energy and, along with generator 925a provides the initial inertial resistance to the acceleration that spools 380 attempt to impose. Clutches 935 are electrically activated by a control unit 940. Clutches 935 are coupled to generators 925b through 925c which are mounted to freewheel on shaft 915. When instructed by control 940, clutches 935 are either connected to shaft 915 and apply torque to the shafts of generators 925a, or they coast on shaft 915 and apply no torque to generators 925a. When a clutch 935 is rotationally coupled to shaft 915, generator 925a turns and generates electrical current which is added to load 930, adding to the rotation of shaft 915. As control 940 activates additional clutches 935, additional generators 925a apply more current to load 930, causing more torsional resistance on shaft 915. Load 930 can be a power grid, a pump or any of a number of other devices that is arranged to use electrical energy.

FIG. 9 shows that the energy storage and extraction device 350 can include a speed and position sensor 945. Sensor 945 can include absolute position optical or magnetic encoders for example. Sensor 945 measures the position and speed of movable obstacles and confined fluids. Sensor 945 is connected to control unit 940 that is arranged to activate clutches 935 under predetermined conditions.

Figure 10:
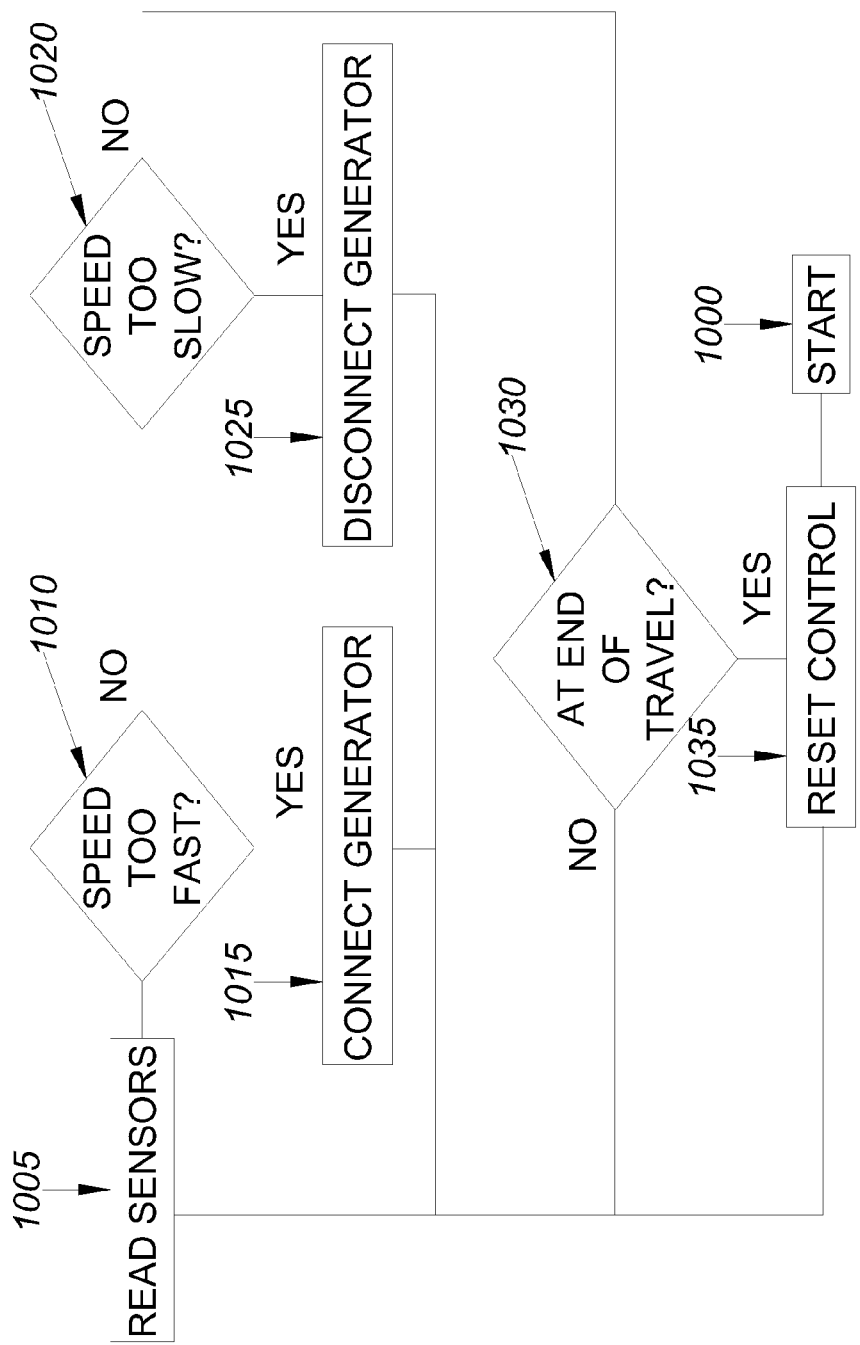
FIG. 10 is a flow chart illustrating an example of a method for the operation of a control.

In at least one implementation, as movable obstacles begin to move under the influence of a flowing fluid, the drag exerted by energy storage and extraction device 350 is small. This permits fluid to flow at or near the speed of the unimpeded flow. As movable obstacles reach the end of their travel, it is desirable to slow their velocity to nearly zero in order to transfer to shaft 340 the maximum amount of the change in the mechanical energy in the mass of the energy extractor, and in the mass of the fluid trapped behind them, to the shaft 340. As a result, more generators 925 are brought on line, thereby increasing power delivered to load 930 while adding resistance to the torque applied to shaft 340, and slowing the motion of the movable obstacles FIG. 10 is a flow chart illustrating an example of a method for the operation of control 940. At the start, block 1000, control 940 is reset. Next, sensor is read, block 1005, and the position and speed of movable obstacles are determined. If the speed at any predetermined position is too high, block 1010, control 940 activates one of clutches, coupling one generator to shaft 915, block 1015, and the sensors are read again, block 1005. If the speed at any predetermined position is too slow, block 1020, control disengages one of clutches 940, disconnecting one generator, block 1025, and the sensors are read again, block 1005. If the speed of movable obstacles is neither too fast nor too slow and the movable obstacles are not at the end of their travel, block 1030, the sensors are read again, block 1005, and the loop continues. If the movable obstacles are at the end of their travel, block 1030, control 940 is reset, block 1035, and the sensors are read again, block 1005. The progress through the instructions and queries in FIG. 10 continues indefinitely during the operation of the embodiments.

FIGS. 11A, 11B and 11C illustrate an example of a flow direction sensing switch 1100. In at least one implementation, the flow direction sensing switch 1100 can detect the direction in which a fluid is flowing and configure an energy extractor accordingly. In particular, the switch 110 can ensure that an energy extractor is maximizing the amount of energy extracted by adjusting portions of the energy extractor, and constitutes a self-sensing ability for—for example—changes in fluid flow direction during reversal of tide flow.

Clearly the device in FIG. 7 would be modified to have the decelerators so located, or modified in activation, that the obstacles 715 would be able to deposit the energy carried into the tunnels by the moving fluids on either end of the tunnel—as the tide changes relocate the entrance to the tunnels from one end to the other. Such or similar modification—in conjunction with FIGS. 11A, 11B, and 11C, permit and automatic non-stop functioning of the energy extraction from moving fluids, regardless of direction of the, for example, tidal direction. This can also be achieved by placing the apparatus on a railroad like rotunda, and leaving the embodiment functioning unidirectionally, as shown and described above; with a weather wane like sensor in the fluid flow commanding the rotunda rotation to always face the incoming fluid.

FIGS. 11A, 11B and 11C show that the switch 1100 can include two paddles 1105a and 1105b (collectively "paddles 1105"). In at least one implementation, the paddles 1105 are oriented such that when one paddle is exposed to a flowing fluid, the other paddle offers minimal resistance to the flowing fluid. In particular, the paddles 1105 can be oriented perpendicular to one another such that one paddle is exposed to the fluid flow while another paddle is edge on to the fluid flow. FIG. 11B shows that when the first paddle 1105a is exposed to the flow the second paddle 1105b offers little resistance to the flow. FIG. 11C shows that when the second paddle 1105b is exposed to the flow the first paddle 1105a offers little resistance to the flow.

FIGS. 11A, 11B and 11C also show that the switch 1100 can include a shaft 1110. In at least one implementation, the shaft 1110 is rotated by the paddles 1105 when the flow direction changes. In particular, the paddles 1105 are attached to the shaft 1110. When the flow changes direction, the shaft 1110 is rotated, changing the orientation of the shaft 1110. One of skill in the art will appreciate that if the shaft 1110 is constrained to only rotate 90 degrees, then one of the paddles 1105 will always be exposed to the flow and the other will always be edge on to the flow FIGS. 11A, 11B and 11C show that the switch 1100 can include two activating knobs 1115a and 1115b (collectively "activating knobs 1115") attached to shaft 1110. In at least one implementation, the activation knobs 1115 are configured such that they can determine whether the louvers 355 within a movable obstacle 310 open or close when the movable obstacle 310 is urged against the switch 1100. In particular, if the fluid flow is in the direction shown in FIG. 11B then the activation knob 1115a will come in contact with lever arm 1120a, closing the louvers. In contrast, if the fluid flow is in the direction shown in FIG. 11C, then the activation knob 1115b will come in contact with lever arm 1120b, opening the louvers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A system for extracting kinetic energy from moving fluid masses, the system comprising:
    an encapsulating means configured to encapsulate a fluid entering the encapsulating means;
    a movable partition within the encapsulating means, the movable partition having a plurality of louvers;
    a plurality of rollers for guiding the movable partition; and
    a decelerating means configured to reduce the velocity of the encapsulated fluid to zero velocity transferring the kinetic energy originally in the incoming fluid to the decelerating means.

2. The system of claim 1, wherein the decelerating means is an inertial energy sink.

3. The system of claim 2, wherein the decelerating means is a potential energy sink.

4. A system for extracting energy from moving fluids, wherein the system comprises:
    encapsulating means configured such that if a fluid enters the encapsulating means, movement of the fluid is constrained, the encapsulating means having an upstream end and a downstream end, and the encapsulating means comprising:
        a first movable partition, wherein the movable partition includes a plurality of louvers, at least one finger, and at least one push rod;
        a plurality of rollers for guiding the first movable partition;
        a guide member, wherein the at least one finger is inserted in the guide member to guide the first movable partition;
        at least one stop at the downstream end of the encapsulating means;
        wherein the first movable partition is configured to move downstream within the encapsulation means in the flowing fluid from the upstream end to the downstream end
        such that the at least one push rod will be urged against the at least one stop to cause the plurality of louvers to open to allow the first movable partition to return upstream; and
    decelerating means connected to the movable partition, wherein the decelerating means is configured to;
        reduce the velocity of the encapsulated fluid to zero velocity; and
        transfers transfer the kinetic energy originally in the incoming fluid to the decelerating means.

5. The system of claim 4, wherein the decelerating means includes: connection member configured to transfer energy from the movable partition and the flowing fluid to an energy sink.

6. The system of claim 5 wherein the energy sink includes one of:
    flywheels;
    pumps; or 7. The system of claim 5 wherein the connection member includes:
a shaft, wherein the shaft includes:
a spool having a spring; and
a one-way clutch; and
a line having a first end attached to the shaft and arranged to wind onto and off of the spool, and a second end attached to the first movable partition;
wherein:
movement of the first movable partition in a first direction unwinds the line from the spool and the clutch grips said shaft, thereby urging said shaft to rotate; and
during movement of the first movable partition in a second direction, the spring causes the line to be rewound on to the spool and the clutch is disengaged from the shaft.

8. The system of claim 7, wherein the spool is conical in shape, wherein the conical shape acts as a variable gear ratio between the movement of the movable partition and the rotation speed of the shaft.

9. The system of claim 4, wherein the encapsulating means comprises:
a first tunnel; and
wherein the first tunnel is oriented so that the flowing fluid within the first tunnel causes the movable partition to move along the guide member.

10. The system of claim 9, wherein the encapsulating means further comprises:
a second tunnel; and
a second movable partition, wherein the second movable partition is placed in the second tunnel.

11. The system of claim 10, wherein:
the first movable partition moves upstream when the second movable partition moves downstream; and
the first movable partition moves downstream when the second movable partition moves upstream.

12. The system of claim 9, further comprising a rotatable support, wherein the rotatable support allows the tunnel to be reoriented.

13. The system of claim 4, wherein the plurality of rollers are configured to facilitate movement of the movable partition along the guide member.

14. The system of claim 4 further comprising:
a sensor, wherein the sensor is configured to monitor the speed and position of the movable partition; and
a control unit, wherein the control unit can adjust the load on the movable partition.

15. A system for extracting energy from moving fluids, wherein the system comprises:
an encapsulator configured such that if a fluid enters the encapsulator, the movement of the fluid is constrained to a single direction; and
a movable partition comprising a plurality of louvers, wherein the movable partition: (i) is at least partially located within the encapsulator; and (ii) is configured to be moved by the encapsulated fluid;
a decelerator configured to reduce the velocity of the movable partition and encapsulated fluid to zero velocity; and
an energy sink, configured to receive from the decelerator the kinetic energy originally in the incoming fluid.

16. A method for extracting kinetic energy from moving fluid masses, the method comprising:
encapsulating a fluid, wherein the fluid is encapsulated using an encapsulating means;
using the encapsulated fluid to move a movable partition having a plurality of louvers, in a closed position, to a first end of the encapsulating means;
reducing the velocity of the encapsulated fluid to zero velocity, wherein the velocity is reduced using decelerating means, wherein the decelerating means transfers the kinetic energy originally in the incoming fluid to the decelerating means; and
moving the plurality of louvers to an open position to allow the movable partition to move to a second end of the encapsulating means.

* * * * *

UNITED STATES PATENT AND TRADEMARK OFFICE
CERTIFICATE OF CORRECTION

| | | |
|---|---|---|
| PATENT NO. | : 8,221,051 B2 | |
| APPLICATION NO. | : 12/830432 | |
| DATED | : July 17, 2012 | |
| INVENTOR(S) | : Lawrence George Brown | |

It is certified that error appears in the above-identified patent and that said Letters Patent is hereby corrected as shown below:

In title page, item (60) Related U.S. Application Data, line 2, after "1, 2010." insert --Continuation-in-part of application No. 12/579,978, filed on October 15, 2009, now abandoned, which claims benefit of provisional application No. 61/213,702, filed on July 6, 2009; and claims benefit of provisional application No. 61/213,837, filed on July 20, 2009; and claims benefit of provisional application No. 61/230,096, filed on July 30, 2009; and claims benefit of provisional application No. 61/233,068, filed on August 11, 2009; and claims benefit of provisional application No. 61/272,052, filed on August 12, 2009; and claims benefit of provisional application No. 61/244,027, filed on September 19, 2009--.

In claim 4, column 16, line 58, delete "transfers".

Signed and Sealed this
Fourth Day of September, 2012

David J. Kappos
*Director of the United States Patent and Trademark Office*